(12) United States Patent
Dobbek

(10) Patent No.: US 6,535,995 B1
(45) Date of Patent: Mar. 18, 2003

(54) PROTOTYPE-BASED VIRTUAL IN-LINE SPARING

(75) Inventor: Jeffrey Joseph Dobbek, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/266,419

(22) Filed: Mar. 10, 1999

(51) Int. Cl.$^7$ ............................................. G11B 20/18
(52) U.S. Cl. ........................... 714/8; 714/710; 711/202
(58) Field of Search .................. 714/8, 710; 369/53.41, 369/53.17; 360/77.08; 711/112, 202–210

(56) References Cited

U.S. PATENT DOCUMENTS

| | | | |
|---|---|---|---|
| 4,498,146 A | 2/1985 | Martinez | 364/900 |
| 4,811,124 A | 3/1989 | Dujari et al. | 360/49 |
| 5,111,444 A | 5/1992 | Fukushima et al. | 369/58 |
| 5,271,018 A | 12/1993 | Chan | 371/10.2 |
| 5,523,903 A | 6/1996 | Hetzler et al. | 360/77.08 |
| 5,561,566 A | 10/1996 | Kigami et al. | 360/48 |
| 5,568,606 A | 10/1996 | Dobbek | 395/182.06 |
| 5,615,190 A | 3/1997 | Best et al. | 369/58 |
| 5,822,142 A | * 10/1998 | Hicken | 360/53 |
| 5,937,435 A | * 8/1999 | Dobbek et al. | 711/202 |

FOREIGN PATENT DOCUMENTS

GB 2285166 A 6/1995 ............ G11B/20/18

OTHER PUBLICATIONS

"Method for Skipping Defective Sectors on Hard Disks", *IBM Technical Disclosure Bulletin*, vol. 28, No. 7, Dec. 1985, pp. 2803–2805.

* cited by examiner

Primary Examiner—Paul R. Myers
(74) Attorney, Agent, or Firm—David A. Hall

(57) ABSTRACT

A direct access storage device (DASD) performs defect mapping and translates logical block address references to physical block addresses with a virtual track (VT) table and a virtual sector (VS) table, and also uses a prototype table ($VS_{pr}$) that contains index locations for all virtual tracks that contain spares and identifies sectors located on the track, and a reassign table ($VS_{re}$) that contains exceptions from the prototype table due to reassignment of a spare sector. The VS table contains index locations that identify a group of sectors located on the track corresponding to the index location, but does not include spares. The VT table includes columns that point into the $VS_{pr}$ and $VS_{re}$ tables. The overall size of the defect mapping tables is reduced by removing the spare sectors from the VS table, thereby more efficiently utilizing storage system resources.

38 Claims, 7 Drawing Sheets

| PBA | | LBA |
|---|---|---|
| 0 | | 0 |
| 1 | | 1 |
| 2 | | 2 |
| 3 | x | |
| 4 | s | |
| 5 | | 3 |
| 6 | s | |
| 7 | | 4 |
| 8 | | 5 |
| 9 | x | |
| 10 | | 6 |
| 11 | | 7 |
| | | |
| 500 | | n |
| 501 | | n + 1 |

```
[1]   vt = FLBA >> n;                                    /* virtual track number */
[2]   vs = FLBA & (2**n-1);                              /* virtual sector number */

[3]   p = VT[vt];
[4]   e = VT[vt + 1];                                    /* bound the search */
[5]   while ((vs >= VS[p]) && (p < e))                   /* count past defects. */
          p++;                                           /* update pointer */
[6]   PBA = FLBA + p;                                    /* include prior defects */

[7]   p = VTre[vt];
[8]   e = VTre[vt+1];                                    /* bound the search */
[9]   while ((vs >= VSre[p]) && (p < e))                 /* count past prior reassigned spares */
          p++;
[10]  PBA -= p;                                          /* remove prior reassigned spares */

[11]  p = 0;
[12]  e = number_of_FLBAs_in_spare_prototype;            /* bound the search */
[13]  while ((vs >= VSpr[p]) && (p < e))                 /* count past previous spares in VT prototype */
          p++;
[14]  PBA += p;                                          /* add in previous "prototype" spares to form:
                                                            pba of FLBA */
```

*FIG. 4*

PROTOTYPE-BASED VIRTUAL IN-LINE SPARING

BACKGROUND OF THE INVENTION

1. Field of the Invention

This invention relates generally to direct access storage devices and, more particularly, to skip-sector defect mapping in such devices.

2. Description of the Related Art

A computer direct access storage device (DASD), such as a magnetic disk drive, has one or more disk platters, each with a magnetizable layer on its surface. Digital data is recorded on a disk in the form of magnetic transitions spaced closely together. The disk surface area is divided into approximately equal-sized portions called sectors, which are further divided into blocks. Data is stored in a series of concentric or spiral tracks across the sectors of the disk.

Within a track, a sector includes a short servo track information area followed by a customer data area. The servo track information area typically includes a sector marker, track identification data, and a servo burst pattern, which are recorded at the time of disk manufacture and are used for positioning of a read/write head over the disk. The customer data area contains data recorded by a disk drive customer, or end user. Recording densities, both in terms of radial tracks per inch and linear density within a track, have reached a level that creates extreme sensitivity to imperfections such as media defects in the magnetizable recording layer. The media defects result in portions of the magnetizable media layer becoming unacceptable for use in recording the magnetic transitions.

One way of dealing with media defects is to perform a disk format operation at the time of DASD manufacture wherein surface analysis testing (SAT) identifies unacceptable, defective sectors and designates some sectors as spares. If additional good sectors become defective during subsequent operation of the DASD, then the defective sectors may be replaced by the spare sectors. In some conventional disk drives, an identification (ID) field is written on the disk prior to each sector during the format operation. The ID field contains specific information concerning the sector that follows, including a logical block address that identifies a cylinder, head, and sector that unambiguously identify the sector. A bit flag in the ID field identifies whether the sector is a defective sector or a spare sector. In this way, information about good sectors, bad sectors, and spare sectors will be known to the disk drive controller.

A technique to increase the capacity of disk drives is to use a no-ID format. This technique uses servo sectors in combination with a defect map to identify data sectors and completely eliminate the need for ID fields. The no-ID format frees up additional disk surface area for storage of customer data. In a no-ID disk drive, the logical block address (LBA) is the address of a logical block of storage that can be used by the disk drive customer. A physical block address (PBA) is the address of a physical block of storage on the disk. To store a block of data, the disk drive must perform a logical to physical address translation to take an LBA reference and derive the correct PBA from among the possible range of PBAs. The LBA-to-PBA conversion typically uses a defect map table that contains the defect information and is usually stored in memory of the DASD. FIG. 1 illustrates the relationship between LBA and PBA. FIG. 1 shows a PBA column 102 that lists the physical block addresses (PBAs) distributed across a disk, and also shows an LBA column 104 that lists the logical block addresses (LBAs), which comprise the data blocks that are available for storage of customer data. The FIG. 1 configuration is provided for purposes of illustration only. Between the PBA column 102 and the LBA column 104 is an indication of the PBAs that are either spares or defects; spare blocks are designated by "S" and defect blocks are designated by "X". The order of blocks in the PBA column 102 corresponds to the order of the blocks on the disk. The blocks in the LBA column 104 are numbered in the order of their availability to the disk user. Thus, it should be clear that the LBA column is numbered according to the PBA blocks, except that the S blocks and X blocks are skipped. As noted above, a reference from a data interface to an LBA must be translated into the proper PBA address to access the actual physical data stored on disk.

One way to implement the LBA-to-PBA translation is to define virtual tracks and virtual sectors, and to perform defect mapping with two tables, a virtual track (VT) table and a virtual sector (VS) table. A virtual track is defined as a contiguous set of data sectors that have a predetermined number of available sectors. Virtual tracks are numbered sequentially, regardless of their physical location. A virtual sector is defined as a sector that is not a spare sector or a defective sector and is contained within a virtual track. All virtual sectors within a virtual track are numbered sequentially.

FIG. 2 shows a received LBA 202 that is to be translated by a disk formatter or disk controller into a PBA that determines a disk drive cylinder, head, sector value for the data block referenced by the LBA. The disk formatter makes use of a VT table 204 that groups together LBAs having shared high order bits. The VT entries are index locations into a VS table 206 that lists the virtual skip sectors for all virtual tracks. That is, the index locations identify a group of skip sectors located on the virtual track corresponding to the index location. The skip sector entries in the VS table 206 pertain to skip sectors, which are sectors that are not available to store data, but are either defective sectors or spare sectors held for future use. For example, skip sectors in FIG. 1 are identified with either an "X" or an "S", referring to defective sectors or spare sectors, respectively.

In the FIG. 2 example, the VT table 204 is indexed by virtual track number. The first entry in the VT table indicates that there are no skip sectors (either defect or spare) preceding the first track of the disk. The second entry in the VT table indicates that, for this example, two defect sectors precede the start of the second virtual track. Thus, the first virtual track includes two skip sectors. The next line in the VT table 204 indicates that a total of five sectors have been skipped before the third virtual track is reached. Thus, there must be three skip sectors in the second virtual track. Likewise, the third virtual track must not have any skip sectors because the number of skip sectors for the fourth virtual track is the same as for the third virtual track. That is, VT[3]=VT[4].

The VS table 206 shown in FIG. 2 contains the skip sectors that are pointed to by offsets from the entries in the VT table 204. That is, the first entry in the VT table is zero, so the disk controller will use a zero offset into the VS table, and therefore the PBA associated with the first skip sector in the VS table for virtual sectors in the first virtual track is the first entry in the VS table, which will be referred to as VS[0]. The second entry in the VT table 204 is a "2" and therefore the index of the first skip sector in the second virtual track is offset from the index of the first skip sector of the first virtual track by two. Thus, the disk formatter will step into the VS table 206 two lines following the VS[0] entry to point to the second following entry, and the first skip sector in the second virtual track is VS[2].

The VT table and VS table technique recognizes that the LBAs for neighboring defect blocks share most of their high order address bits, making redundant much of the information otherwise stored in a defect map. To reduce the amount of memory needed to store the defect map, the mostly redundant high order bits of the LBAs are used as indexes into the VT table 204, whose entries act as pointers to locations in the VS table 206. The entries in the VS table 206 contain only the low order LBA bits that correspond to the skip sector addresses. It is not necessary for the VS entries to contain the high order LBA bits, because the VT entries point to particular groups of sectors sharing common LBA high order bits. The VT table 204 is generated by constructing a list of the first LBA following a defect sector of a spare sector in the PBA range. For each virtual track, the VT table contains an entry that identifies the cumulative (total) number of skip sectors contained up to the start of that virtual track. Thus, the VT table 204 is indexed by the virtual track, and each entry indicates the cumulative number of skip sectors on the disk prior to that track.

To map a given LBA to a PBA, the high order bits of the given LBA (the virtual track number) are used to select an entry point into the VT table 204. Because the VS table 206 contains entries only for skip sectors and not for all virtual sectors, each VS table entry identifies the virtual sector number of the first good virtual sector in the virtual track identified by the VT table 204 following the skip. That is, the LBA would indicate the PBA, but for the presence of skip sectors. Therefore, it is necessary to add the cumulative number of skip sectors to the LBA to get the next available data sector.

When an LBA is received, the low order bits of the LBA are used to search the VS table 206 until a virtual sector entry is located that is greater than the value of the low order LBA bits. This index establishes the number of sector skips that must be performed to arrive at the correct virtual sector number for the given LBA. That is, an offset value that is equal to the offset into the VS table 206 is added to the LBA to produce the PBA value. The PBA is then used to derive the correct cylinder, head, and sector reference to the physical location of data stored on the disk. The calculation of the PBA may be represented by Equation (1) below:

$$PBA=FLBA+FIND(\text{first } S[p]>VS, \text{ where } p<=VT[FLBA]<VT[FLBA+1]) \quad (1)$$

where FLBA corresponds to the file LBA, S[p] is the skip sector number entry in the VS table 206, VS is the virtual sector number, or the low order bits of the FLBA, and VT is the virtual track number of the current virtual track, so that the FIND function finds the first skip sector number (the index location) in the VS table that is greater than the low order bit value in the LBA, for the current virtual track.

An exemplary system using the VT and VS tables in a no-ID disk is described in U.K. patent GB 2 285 166 to Dobbek and Hetzler, which is assigned to the International Business Machines Corporation (IBM Corp.) and is incorporated herein by this reference. A defect management system using virtual tracks and virtual sectors, and defining a VT table and VS table, is efficient because it uses pointers to quickly determine the PBA value to locate a cylinder, head, and sector reference. Unfortunately, spare sectors account for a large percentage of the skips that must be stored in the VS table. In current disk drives, there can easily be four hundred spare sectors for every gigabyte of disk storage. In the next generation of disk drives, it is anticipated that the number of spare sectors per gigabyte could increase by a factor of ten. Each one of these skip sectors must have a VT/VS combination entry in the respective tables, which means that the size of these tables will significantly increase.

Disk defect management using VT and VS tables to perform LBA-to-PBA translation can be implemented relatively easily in software that is stored in program memory of the disk drive and typically is executed by the CPU or state machines of the disk drive formatter. It is anticipated that an increasing amount of defect management software will be located in firmware of the disk drive, because performance speed is increased and demand on disk drive resources is increased. This will place increased importance on reduced utilization of disk drive resources such as memory.

From the discussion above, it should be apparent that there is a need for a disk drive storage system that more efficiently utilizes storage system resources. The present invention solves this need.

SUMMARY OF THE INVENTION

The present invention provides a direct access storage device (DASD) that performs defect mapping and translates logical block address references to physical block addresses with a virtual track (VT) table and a virtual sector (VS) table, and also uses a prototype table ($VS_{pr}$) that contains index locations for all virtual tracks that contain spares and identifies sectors located on the virtual tracks, and a reassign table ($VS_{re}$) that contains exceptions from the prototype table due to reassignment of a spare sector. The VT table groups together LBAs having shared high order bits and contains pointers to index locations in the VS table, which contains index locations that identify a group of sectors located on the track corresponding to the index location, but does not include spares. Columns are added to the VT table to serve as pointers into the $VS_{pr}$ and $VS_{re}$ tables. In accordance with the invention, the overall size of the defect mapping tables is reduced by appropriately configuring the virtual tracks such that spare sectors can be removed from the VS table. This more efficiently utilizes storage system resources.

The prototype table $VS_{pr}$ is a prototype for all virtual tracks that contain spare locations within each virtual track, where a virtual track is defined as a contiguous set of data sectors that have a predetermined number of available sectors, and are numbered sequentially, regardless of their physical location. The prototype table $VS_{pr}$ entries are similar to entries in a conventional VS table, except that they are placed together in one table and refer to all virtual tracks. The reassignment table $VS_{re}$ is for sector reassignments, which occur at much lower rates than defects and spares. In this way, the tables included for defect mapping comprise a VT table, VS table, prototype table $VS_{pr}$, and reassignment table $VS_{re}$, and the total dedicated storage required for these tables is less than that needed for a conventional disk drive with conventional VT and VS tables. The columns added to the VT table may be referred to as the $VT_{sp}$ column or table, which contains prior spare blocks, and the $VT_{re}$ column or table, which contains VT reassign blocks. The $VT_{sp}$ table comprises the VT table before any reassigns have been performed, such that the $VT_{sp}$ table is a list of the cumulative number of spare blocks per track.

Other features and advantages of the present invention should be apparent from the following description of the preferred embodiment, which illustrates, by way of example, the principles of the invention.

BRIEF DESCRIPTION OF THE DRAWINGS

FIG. 1 is a representation of the range of physical block addresses and logical block addresses in a direct access storage device (DASD).

FIG. 4 is a pseudo code representation of the operating steps performed by a DASD constructed in accordance with the present invention, using the defect mapping tables illustrated in FIG. 3.

DESCRIPTION OF THE PREFERRED EMBODIMENT

Figure 2:
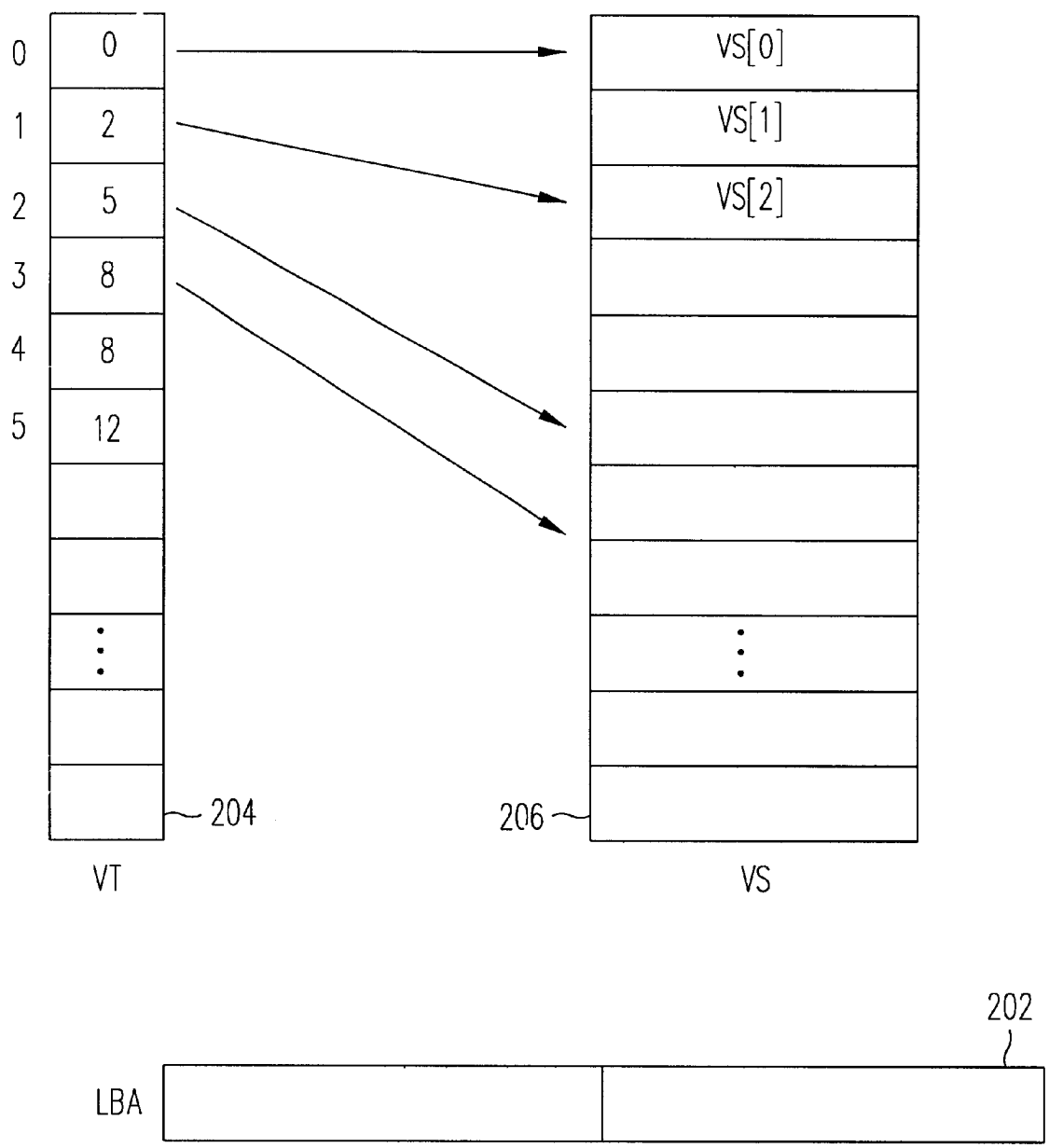
FIG. 2 illustrates a prior art implementation of performing defect mapping with a virtual track and virtual sector table for a disk.
Figure 3:
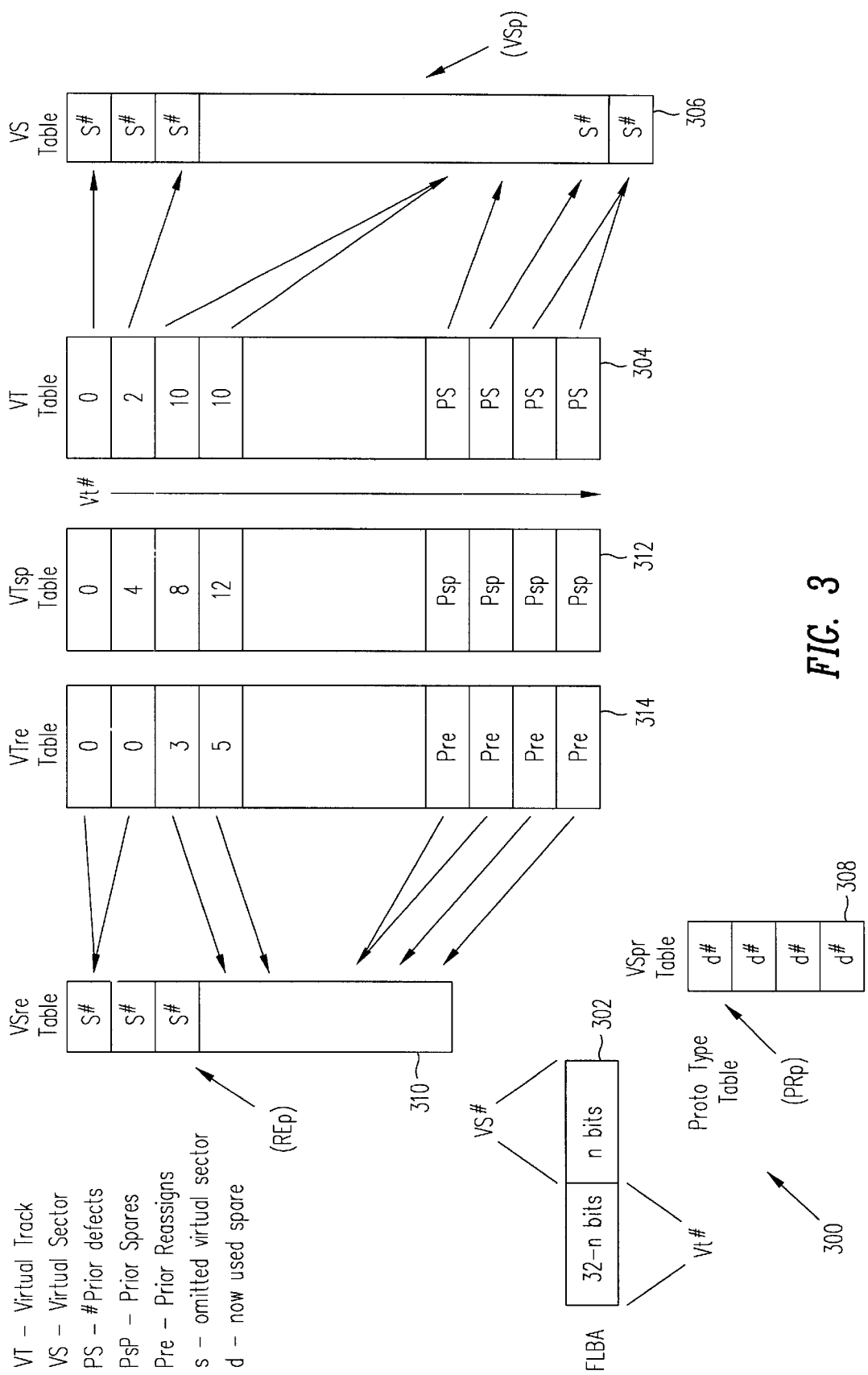
FIG. 3 is a representation of the defect mapping tables used in a DASD constructed in accordance with the present invention.

FIG. 3 is a representation of the defect mapping tables 300 used in a direct access storage device (DASD) constructed in accordance with the present invention. A received file logical block address (FLBA) 302 is a binary representation of a data address that is to be translated from a logical (virtual) value to a corresponding physical block address (PBA) where the data specified by the FLBA resides on the disk. The FLBA is received from a disk drive interface for processing. A virtual track number from the FLBA is identified in the virtual track (VT) table 304 and is used as an index into a virtual sector (VS) table 306. That is, a search is performed on the VS table to determine an offset into the VS table, which is added to the received FLBA to determine an index location, using the virtual track table entry following the VT entry as the search boundary.

In accordance with the invention, the VS table 306 contains only defect sector information. A DASD constructed in accordance with the invention has the initial number of spare sectors in all the virtual tracks the same. More particularly, the same sectors in each virtual track are initially designated as spares, and therefore the spare sectors in all virtual tracks can be specified by a VS prototype spares table $VS_{pr}$ 308 containing the spare sector information for only one virtual track. A VS reassignment table $VS_{re}$ 310 contains information relating to spare sectors that have been reassigned from being spares to containing customer data. The FLBA-to-PBA conversion is accomplished by increasing the FLBA by the VS table index and by the number of spare sectors prior to the FLBA, less the number of reassigned sectors prior to the FLBA. Removing the spare sectors from the VS table 306 and using the $VS_{pr}$ prototype table 308 in conjunction with the reassignment table $VS_{re}$ 310 permits the overall size of the defect mapping tables 300 to be reduced. The FLBA-to-PBA conversion process can be performed with relatively simple programming steps, thereby permitting the conversion process programming to be located in the DASD firmware or in hardware state machines known to those skilled in the art. In addition, the total storage space required by the various tables constructed in accordance with the present invention is less than a conventional defect mapping arrangement for an equal number of storage media blocks. In this way, storage system efficiency is increased.

FIG. 3 indicates that the received FLBA 302 is a 32-bit word that is subdivided from the full complement of bits into a low-order portion of n bits and a high-order portion of 32-n bits, such that the low-order bits represent the virtual sector (VS) number and the high-order bits represent the virtual track (VT) number. The VT number points to a value in the VT table, and the VT table value is used as an index into the VS table.

As compared with conventional defect mapping tables, the defect tables 300 in accordance with the present invention include two additional VT tables or columns, a $VT_{sp}$ table 312 and a $VT_{re}$ table 314. These tables 312, 314 can be implemented, if desired, as additional columns of the VT table 304. As compared with a conventional virtual sector table, the VS table 306 in accordance with the invention contains information relating only to defect sectors.

Information relating to spare sectors is contained in the prototype table $VS_{pr}$ 308, which contains addresses of spare sectors for all the tracks in an initial (production) configuration, prior to any reassignment. As noted above, because all the tracks have the same initial number of spare sectors, the number of spare sectors in any single virtual track is the same for all tracks and it is only necessary to know the spare sector mapping for one track. After the disk drive is used, some data sectors may become defective, and then one or more sectors that were previously designated spare sectors will be designated as new data sectors. That is, the spare sectors will be reassigned. Information relating to sectors reassigned from spare status to data status is contained in the reassignment table $VS_{re}$ 310.

FIG. 4 is a program representation of the operating steps performed in implementing an FLBA-to-LBA translation in accordance with the present invention. The FIG. 4 program steps are written in the "C" programming language, but it should be clear that other computer languages will suffice, so long as the DASD is capable of executing the program steps. In the first line of program code, identified with [1] in FIG. 4, the virtual track number is set equal to the high order bits of the FLBA. In the second line [2] of the program code, the virtual sector number is set equal to the low order bits of the FLBA. In the preferred embodiment of the illustrated code, this is accomplished by shifting the bit representation of the FLBA.

Next, the search into the VS table is performed. As indicated in line [3] of the program code, a pointer "p" is set equal to the VT table entry specified by an index value equal to the virtual track number. Line [4] indicates that an index boundary for the search is set equal to "e", the first entry in the VT table past the cumulative number of defects specified from the VT table indexed by the virtual track number. This value is specified in line [4] by the value VT[vt+1], where "vt" is the virtual track number from the FLBA. The search phrase is given by line [5] of the FIG. 4 program code, which specifies that the pointer "p" is incremented for as long as two conditions are met: (1) the virtual sector number of the FLBA data is greater than or equal to the VS table entry indexed by the pointer "p", and (2) the pointer "p" is less than the index boundary "e". Once the stopping criteria specified by line [5] is met, the PBA value is now the sum of the FLBA and the pointer "p", as indicated by line [6].

After the VS table search is completed, a $VS_{re}$ search is performed. This search locates the reassignment value to be combined with the PBA value for computation. The first line of this search routine, given by line [7] of FIG. 4, indicates that the pointer value is set to the $VT_{re}$ table entry specified by the FLBA virtual track number. Line [8] indicates that an index boundary for the search "e" is set equal to the next entry in the $VT_{re}$ table after the $VT_{re}$ table entry indexed by the virtual track number. The search phrase is given by line [9] of the FIG. 4 program code, which specifies that a pointer "p" is incremented for as long as two conditions are met: (1) the virtual sector number of the FLBA data is greater than or equal to the $VS_{re}$ table entry indexed by the pointer "p", and (2) the pointer "p" is less than the index boundary "e". Once the stopping criteria specified by line [9] is met, the PBA value is combined with the pointer value, so that the PBA value is decreased by the pointer value, as indicated by line [10].

Next, the prototype spares $VS_{pr}$ table data is combined with the PBA data. As indicated in line [11], a pointer "p" is set to zero. Line [12] indicates that an index boundary for the search "e" is set equal to the number of FLBAs in a prototype spare track. As noted above, the initial number of spares per track is fixed. In the preferred embodiment, the initial number of spares per track is the same for all tracks, and therefore no table look-up is necessary to obtain the boundary pointer. The $VS_{pr}$ search phrase is given by line [13] of the FIG. 4 program code, which specifies that the pointer "p" is incremented for as long as two conditions are met: (1) the virtual sector number of the FLBA data is greater than or equal to the $VS_{pr}$ table entry indexed by the pointer "p", and (2) the pointer "p" is less than the index boundary "e". Once the stopping criteria specified by line [13] is met, the PBA value is combined with the pointer value, so that the PBA value is increased by the pointer value, as indicated by line [14] of the FIG. 4 program code. It should be understood that the sequence of these three searches can be changed from that described above with no effect on the accuracy of the LBA-to-PBA translation process. In addition, a binary search could be used.

The search routines illustrated by the program code of FIG. 4 are represented in FIG. 3 by pseudocode FIND functions. Thus, the VS table search specified by lines [3] through [6] of FIG. 4 may be represented by Equation 2:

$$\text{FIND(first } s\#>vs\# \text{ in VS, "VS}p\text{", on } vt=vt\#) \qquad (2)$$

where s# is the sector number from the VS table and vs# is the virtual sector number from the FLBA, VSp is the found virtual sector index, vt is the virtual track number into the VT table, and vt# is the virtual track number from the FLBA. Because the VS table contains no information regarding spares, this search will typically be a relatively quick linear or binary search of a reduced size table. This is due to the fact that spares otherwise account for a large percentage of the skips stored in conventional VS tables. The $VS_{pr}$ search specified by lines [11] to [14] of FIG. 4 may be represented by Equation 3:

$$\text{FIND(first } s\#>vs\# \text{ in VS}_{pr}, \text{ "PRp")+VT}_{sp}[vt\#] \qquad (3)$$

where PRp is the found sector index. The $VS_{re}$ search specified by lines [7] to [10] of FIG. 4 may be represented by Equation 4:

$$\text{FIND(first } s\#>vs\# \text{ in VS}_{re}, \text{ "REp", on } vt=vt\#) \qquad (4)$$

where REp is the found sector index. The $VS_{re}$ table initially is empty. Similarly, the $VT_{sp}$ table is initially the same as the VT table, before any reassignments.

Thus, the complete combining sequence for the FLBA-to-PBA translation is to start with the FLBA value, add the VSp value from Equation (2), add the PRp value from Equation (3), and subtract the REp value from Equation (4), as defined above.

In a sequential read or write operation, or when an entire track may be mapped during a format operation, it may be necessary to search the defect mapping tables in a substantially linear fashion. In such a case, the exemplary "C" program code in FIG. 4 shows that a spare sector that is found in the $VS_{pr}$ table may be ignored if it also was found in the $VS_{re}$ table. This would occur because the $VS_{pr}$ table would provide a+1 offset and the $VS_{re}$ table would provide a−1 offset, and the two would cancel in the FLBA-to-PBA translation process. The result is that no skip will be included on the particular virtual track in question for the $VS_{pr}$ entry.

When a sector of a virtual track becomes defective, the DASD formatter or other appropriate DASD component reassigns a spare sector that is not being used to become a replacement data sector. The affected data, if any, is moved to the reassigned sector in a data recovery process. In the reassign operation, the DASD formatter finds the $VS_{pr}$ entry nearest the FLBA being reassigned, and without a corresponding $VS_{re}$ entry. The corresponding VSpr entry is then added to the VSre table and the FLBA being reassigned is added to the VS table. It should be noted that adding entries to the group of VS-related tables causes corresponding changes to the group of VT-related tables.

It also should be noted that the VTsp table is not needed if the DASD formatter includes a multiplier that can calculate the spare offset based on the virtual track number. It should be apparent that this follows from the fact that each virtual track has the same number of spares. It also should be noted that even a multiplier is not needed if the number of spares per virtual track is a power of two, as computer multiplication by powers of two is easily implemented by a shift operation, where each shift left (with zero fill) is equivalent to multiplication by two. Thus, the number of skips from an initial spare location for a virtual track is equal to the virtual track number shifted left by $\text{Log}_2$ (base 2) of the number of spares on a virtual track.

Figure 5:
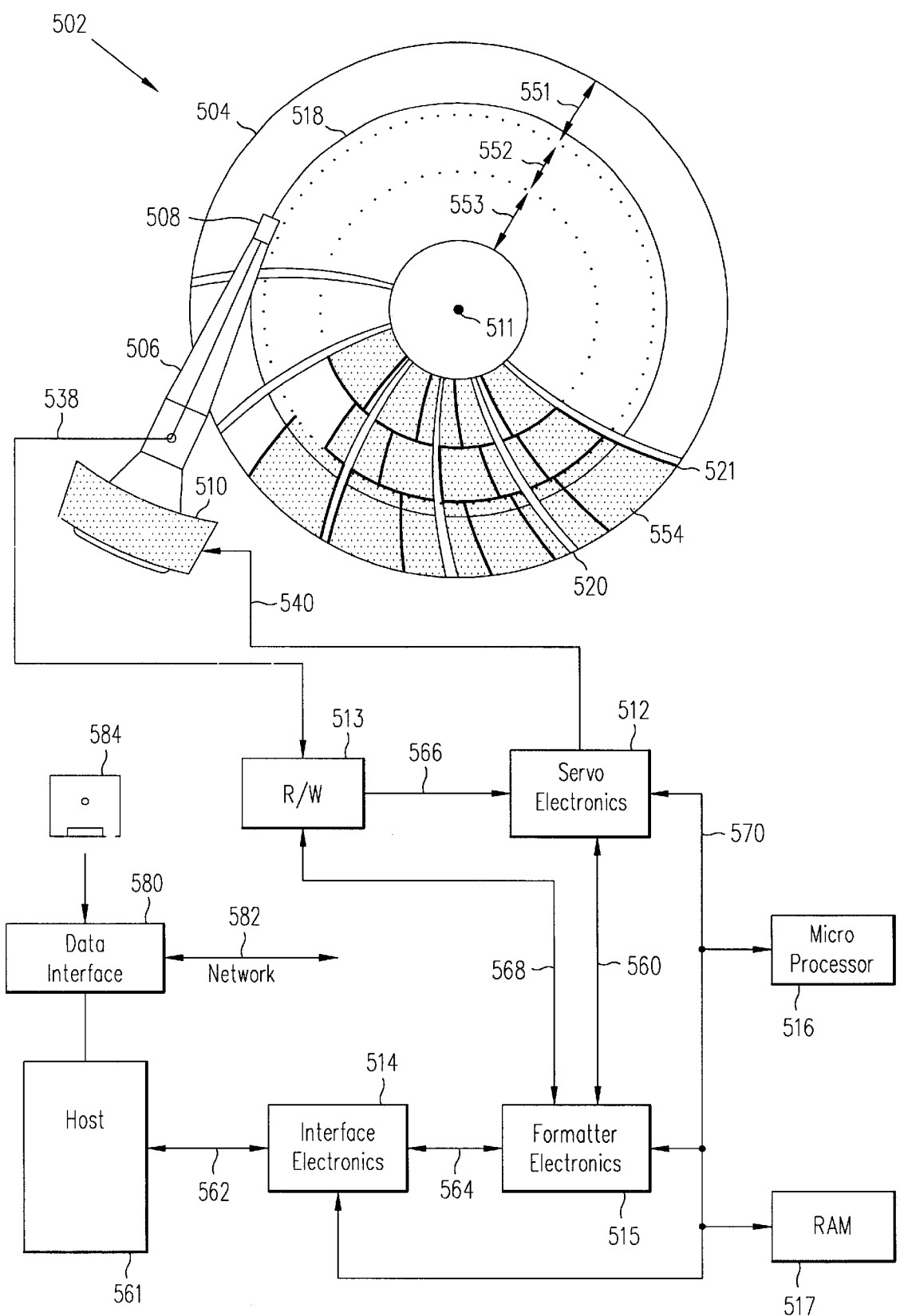
FIG. 5 is a block diagram representation of a DASD that utilizes the tables illustrated in FIG. 3, in accordance with the present invention.

FIG. 5 illustrates an exemplary direct access storage device (DASD) 500 comprising a disk drive constructed in accordance with the present invention. The DASD includes multiple disks, although only the top surface of the top disk 502 is visible in FIG. 5. Deposited on the disks is a magnetic recording medium for storing magnetically encoded information. The DASD 500 also includes an actuator arm 506, a data recording transducer 508 (also called a recording head), a voice coil motor 510, servo electronics 512, read/write electronics 513, interface electronics 514, formatter electronics 515, a disk drive microprocessor 516, and disk drive random access memory (RAM) 517. The data recording disk 502 rotates about a center of rotation 511, and is divided for purposes of head positioning into a set of radially spaced tracks, one of which is indicated at 518. The DASD 500 has a zone-bit recording format, so that the tracks are grouped radially into a number of zones, three of which are shown as 551, 552, and 553. Each zone has a different track storage density.

Each of the disks 502 includes a plurality of servo sectors 520 that extend across the tracks in a generally radial direction. Each track has a reference index 521. Within each zone, the tracks are circumferentially divided into a number of data sectors 554, and contain no sector ID fields. All the data sectors are substantially the same size, as expressed in bytes of data. It should be understood that the number of data sectors per track can vary from zone to zone. Moreover, within a track, some of the data sectors may not begin immediately following a servo sector, and some of the data sectors may be split by servo sectors. With multiple disks, the disk drive 500 has multiple heads, and the set of tracks that are at the same radius on all disk surfaces is referred to as a cylinder.

The read/write electronics 513 receives signals from the transducer 508, over a readback signal line 538, and then passes servo information to the servo electronics 512 over a signal line 566 and passes data signals to the formatter 515 over a data signal line 568. The servo electronics 512 uses the servo information to produce a control signal that is provided over a signal line 540 to drive the voice coil motor 510 to position the recording transducer 508. The interface electronics 514 communicates with a host computer 561 over a host interface 562, passing data and command information. The interface electronics also communicates with the formatter 515 over an interface 564. The microprocessor 516 communicates with the various other electronics over an interface 570.

In the operation of the disk drive 500, the interface electronics 514 receives a request over the interface 562 for reading or writing data sectors. The formatter electronics 515 receives a list of requested data sectors from the interface electronics 514 and converts them into zone, cylinder, head, and data sector numbers that uniquely identify the location of the desired data sectors. The head and cylinder information are passed over a signal line 560 to the servo electronics 512, which is responsible for positioning the recording head 508 over the appropriate data sector on the appropriate cylinder. If the cylinder number provided to the servo electronics 512 is not the same as the track number over which the recording head 508 is positioned, then the servo electronics 512 first executes a seek operation to reposition the recording head over the appropriate cylinder.

After the servo electronics 512 has positioned the recording head 508 over the appropriate cylinder, the servo electronics begins executing sector computations to locate and identify the desired data sector. Each servo sector is identified as it passes beneath the recording head 508, and the formatter electronics 515 utilizes a variety of servo information relating to the data sectors. This information is described in greater detail in the aforementioned U.K. patent to Dobbek and Hetzler, GB 2 285 166 A, which is incorporated herein by this reference.

Figure 6:
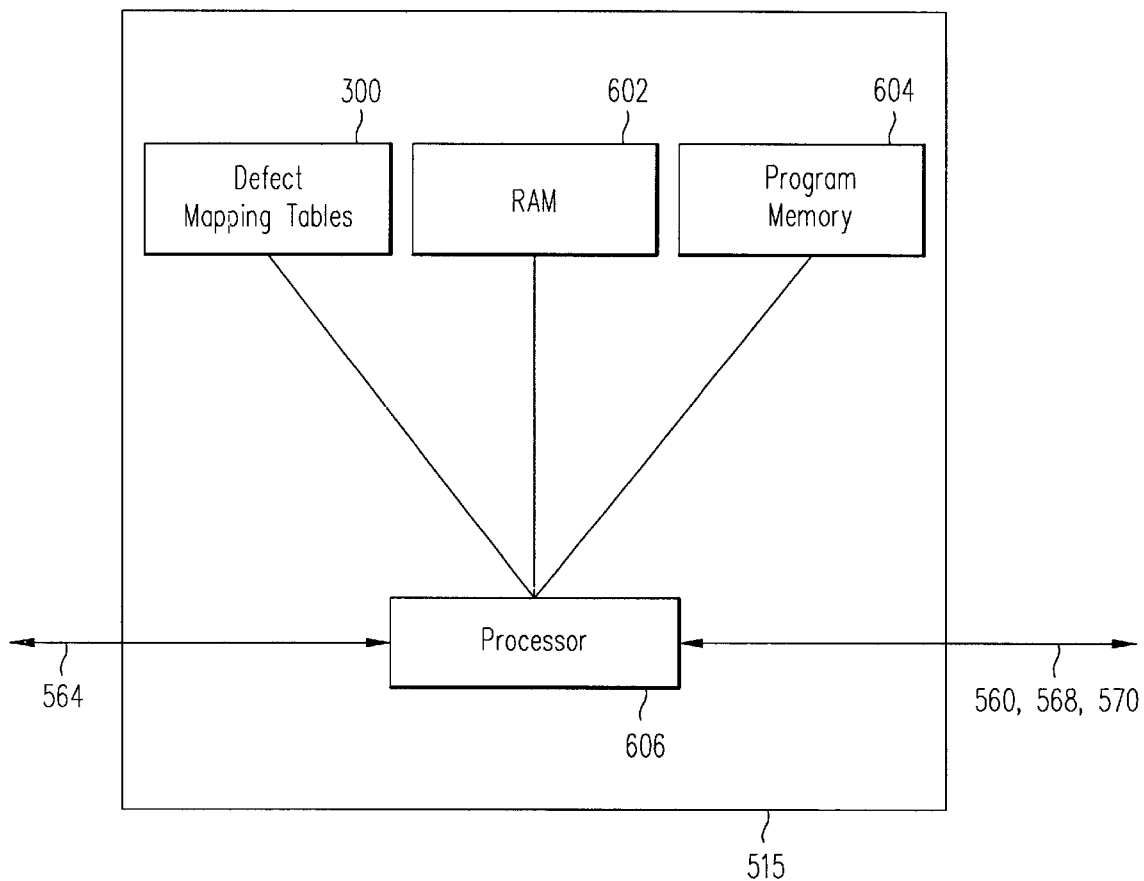
FIG. 6 is a block diagram of the DASD formatter illustrated in FIG. 5.

FIG. 6 is a block diagram that shows components of the formatter electronics 515, which performs the LBA-to-PBA translation process. The defect mapping tables 300 are shown in FIG. 6 as being part of the formatter electronics, although the tables may be configured as part of formatter data RAM 602 or as part of other data storage in the disk drive 300. The LBA-to-PBA translation process as described above is specified by program instructions stored in the formatter program memory 604. The program instructions are executed by the formatter processor 606 and comprise the formatter firmware. The formatter processor 606 receives the LBAs for translation from the data interface electronics 514 (FIG. 5) over the interface line 564. The processor also communicates with the other external components over the various interfaces 560, 568, 570.

The program instructions, when executed, perform processing steps and can be received into the program memory 604 of the formatter electronics 515 in a variety of methods. For example, the program instructions can be stored into the program memory 604 using appropriate ancillary equipment, such as EEPROM storing devices and the like, if the program memory is suitably constructed. The program memory also can be fabricated such that the program instructions are contained in the memory without separate storing operations. These methods will be understood by those skilled in the art without further explanation.

Alternatively, the program instructions can be received into the host computer 561 (FIG. 5) through a data interface and then stored into the formatter program memory 604. Turning to FIG. 5, the host computer 561 is shown with an external data interface 580, through which the host computer may receive data and transfer that data into the DASD 500, including, for example, storage into the formatter electronics 515 and the program memory 604. The data interface 580 may permit data exchange with a network or a storage device.

If the data interface 580 is a network interface, then communications may be established with a network 582 such as the Internet, thereby permitting the download of program instructions in the form of data files, programming, and executable code from remote file servers or other computer systems. The other computer systems can comprise, for example, computer systems similar in construction to the host computer 561. In this way, the formatter electronics 515 can receive program instructions into the program memory 604 (FIG. 6) over the network 582, after communication between the host computer 561 and the network has been established by well-known methods, which will be understood by those skilled in the art without further explanation.

If the data interface 580 is a DASD interface, then data may be received from a program product such as a disk storage media, comprising machine-readable storage devices such as magnetic media disks on which are recorded program instructions whose execution implements programming operations of the present invention. Thus, a floppy disk 584 is illustrated in FIG. 5 being inserted into the data interface 580, representing insertion of the floppy disk into a disk drive. The host computer 561 can receive program instructions stored on the disk 584 and can transfer these instructions into the formatter electronics 515 in cooperation with the formatter processor 606 for storage in the program memory 604. In this way, the formatter electronics can receive data into the program memory from a program product.

Processing Steps of the Formatter

Figure 7:
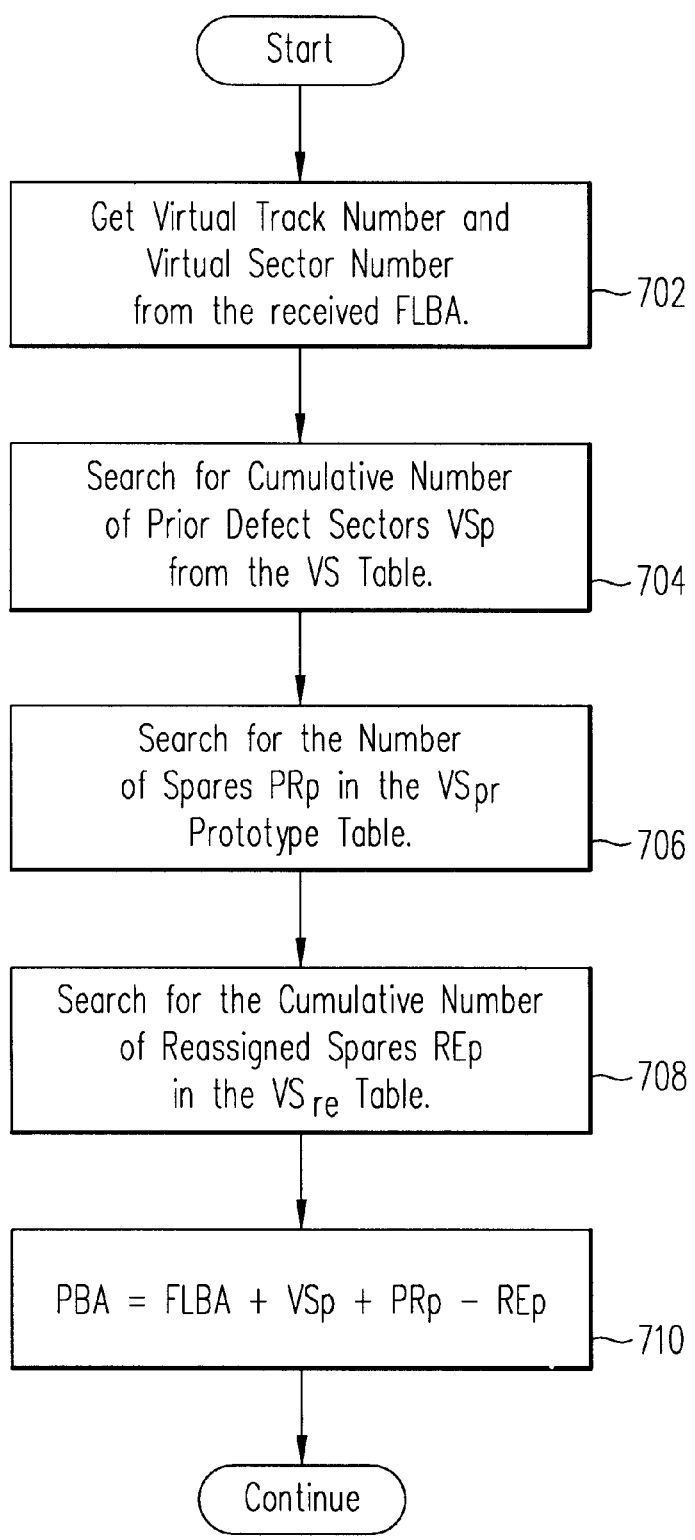
FIG. 7 is a flow diagram that illustrates the operating steps performed by the DASD shown in FIG. 5 to perform LBA-to-PBA translation.

FIG. 7 is a flow diagram that shows the processing steps performed by the formatter 515 illustrated in FIG. 6. The first processing step, represented by the FIG. 7 flow diagram box numbered 702, is to get the virtual track number and the virtual sector number from the received FLBA value. As noted above, the virtual track number comprises the high order bits of the FLBA, and the virtual sector number comprises the low order bits of the FLBA.

The next operating step is to search in the VS table for the cumulative number of defect sectors VSp prior to the track specified by the received virtual track number and defects prior to the virtual sector number on the virtual track specified by the virtual track number discussed above. This step is represented by the FIG. 7 flow diagram box numbered 704. This search is performed by setting a pointer "p" equal to the value in the VT table corresponding to the received virtual track number. An index boundary "e" for the search is set equal to the first entry in the VT table following the p-entry. The search is implemented by incrementing the pointer "p" for as long as two conditions are met: (1) the virtual sector number of the FLBA data is greater than or equal to the VS table entry indexed by the pointer "p", and (2) the pointer "p" is less than the index boundary "e". In this way, the VS table is searched, starting with the track number offset, until one of the two conditions is not met.

After the number of prior defect sectors VSp are found, the next step is to search for the number of spares PRp in the $VS_{pr}$ prototype table, as indicated by the flow diagram box numbered 706. As explained above, this search is implemented by first setting an index boundary for the search to "e", which is equal to the number of FLBAs in a prototype spare track. A pointer "p" is then incremented and used as an index for the $VS_{pr}$ table search for as long as two conditions are met: (1) the virtual sector number of the FLBA data is greater than or equal to the $VS_{pr}$ table entry indexed by the pointer "p", and (2) the pointer "p" is less than the index boundary "e".

The next step for the formatter is to search for the cumulative number REp of reassigned spare sectors in the $VS_{re}$ table. This search is represented by the flow diagram box numbered 708. In the first step of processing represented by the box 708, a pointer value "p" is set to the $VT_{re}$ table entry specified by the FLBA virtual track number. An index boundary "e" for the search is set equal to the first entry in the $VT_{re}$ table past the $VT_{re}$ table entry indexed by the virtual track number. The pointer "p" is incremented for as long as two conditions are met: (1) the virtual sector number of the FLBA data is greater than or equal to the $VS_{re}$ table entry indexed by the pointer "p", and (2) the pointer "p" is less than the index boundary "e".

After the three terms 704, 706, 708 above are determined, the PBA is calculated by combining the terms, so that the PBA is given by Equation 5:

$$PBA = FLBA + VSp + PRp - REp \qquad (5)$$

as represented by the FIG. 7 flow diagram box numbered 710. The PBA is provided by the DASD formatter to the interface electronics.

Thus, a storage device constructed in accordance with the invention performs defect mapping and translates logical block address references to physical block addresses with a VT table and a VS table, that does not contain spare sector information. Rather, the VS table includes defect information, and the storage device also uses a prototype table ($VS_{pr}$) that contains index locations for all virtual tracks that contain spares and identifies sectors located on the track, and a reassign table ($VS_{re}$) that contains exceptions from the prototype table due to reassignment of a spare sector. The VT table includes columns that point into the VS, $VS_{pr}$, and $VS_{re}$ tables. The overall size of the defect mapping tables is reduced by removing the spare sectors from the VS table, thereby more efficiently utilizing storage system resources.

The present invention has been described above in terms of presently preferred embodiments so that an understanding of the present invention can be conveyed. There are, however, many configurations for data storage systems not specifically described herein but with which the present invention is applicable. The present invention should therefore not be seen as limited to the particular embodiments described herein, but rather, it should be understood that the present invention has wide applicability with respect to data storage systems generally. All modifications, variations, or equivalent arrangements and implementations that are within the scope of the attached claims should therefore been considered within the scope of the invention.

I claim:

1. A method for translating file logical block address (FLBA) data references of a direct access storage device (DASD) into physical block address (PBA) references of the DASD, the method comprising the steps of:

(a) receiving an FLBA and selecting a virtual track number from the FLBA and a virtual sector number from the FLBA;

(b) referencing the virtual track number and the next virtual track number into a VT table to select a starting VS table sector index value for a search of a VS table and to select an ending boundary value for the search, and referencing a selected VS table sector index value into the VS table to select a defect skip offset;

(c) referencing the virtual track number and the next virtual track number into a VS Reassignment table to select a starting VS Reassignment table sector index value for a search of the VS Reassignment table and to select an ending boundary value for the search, and referencing a selected VS Reassignment table sector index value to select a sector reassignment offset;

(d) referencing the virtual track number and the next virtual track number into a VS Prototype Spares table to select a starting VS prototype spares table sector index value for a search of the VS Prototype Spares table and to select an ending boundary value for the search, and referencing a selected VS Prototype Spares table sector index value to select a prototype spares offset; and (e) determining the PBA by combining the selected VS table sector index value, defect skip offset, sector reassignment offset, and prototype spares offset.

2. A method as defined in claim 1, wherein the step of searching the VS table comprises locating a VS table entry that is greater than the selected virtual sector number and whose index into the VS table is greater than or equal to the starting VS table sector index value and not greater than the search ending boundary value.

3. A method as defined in claim 2, wherein the step of searching the VS Reassignment table comprises locating a VS Reassignment table entry that is greater than the selected virtual sector number and whose index value into the VS Reassignment table is greater than or equal to the starting VS Reassignment table sector index value and not greater than the search ending boundary value.

4. A method as defined in claim 2, wherein the step of searching the VS Prototype Spares table comprises locating a VS Prototype Spares table entry that is greater than the selected virtual sector number and whose index value into the VS Prototype Spares table is greater than or equal to the starting VS Prototype Spares sector index value and not greater than the search ending boundary value.

5. A method as defined in claim 1, wherein the VS table contains entries that represent defective sectors only.

6. A method as defined in claim 1, wherein the VS table contains entries that represent defective sectors and contains no entries that represent spare sectors.

7. A data storage system comprising:

a data recording medium with spaced tracks and data storage sectors;

a sector defect map having a VT table, a VS table, a sector reassignment table, and a sector prototype spares table; and a disk controller that receives file logical block address (FLBA) data references for translation into physical block address (PBA) references of the data storage system, wherein the disk controller translates the FLBA references to PBA references by receiving an FLBA and selecting a virtual track number from the FLBA and a virtual sector number from the FLBA, referencing the virtual track number and the next virtual track number into a VT table to select a starting VS table sector index value for a search of a VS table and to select an ending boundary value for the search, and referencing a selected VS table sector index value into the VS table to select a defect skip offset, referencing the virtual track number and the next virtual track number into a VS Reassignment table to select a starting VS Reassignment table sector index value for a search of the VS Reassignment table and to select an ending boundary value for the search, and referencing a selected VS Reassignment table sector index value to select a sector reassignment offset, referencing the virtual track number and the next virtual track number into a VS Prototype Spares table to select a starting VS prototype spares table sector index value for a search of the VS Prototype Spares table and to select an ending boundary value for the search, and referencing a selected VS Prototype Spares table sector index value to select a prototype spares offset, and determining the PBA by combining the selected VS table sector index value, defect skip offset, sector reassignment offset, and prototype spares offset.

8. A data storage system as defined in claim 7, wherein the disk controller searches the VS table by locating a VS table entry that is greater than the selected virtual sector number and whose index into the VS table is greater than or equal to the starting VS table sector index value and not greater than the search ending boundary value.

9. A data storage system as defined in claim 8, wherein the disk controller searches the VS Reassignment table by locating a VS Reassignment table entry that is greater than the selected virtual sector number and whose index value into the VS Reassignment table is greater than or equal to the starting VS Reassignment table sector index value and not greater than the search ending boundary value.

10. A data storage system as defined in claim 8, wherein the disk controller searches the VS Prototype Spares table by locating a VS Prototype Spares table entry that is greater than the selected virtual sector number and whose index value into the VS Prototype Spares table is greater than or equal to the starting VS Prototype Spares sector index value and not greater than the search ending boundary value.

11. A data storage system as defined in claim 7, wherein the VS table contains entries that represent defective sectors only.

12. A data storage system as defined in claim 7, wherein the VS table contains entries that represent defective sectors and contains no entries that represent spare sectors.

13. A system that maps around skip sectors in a data storage device having a data storage medium with spaced tracks and data storage sectors in which received file logical block address (FLBA) data references of a direct access storage device (DASD) are translated into physical block address (PBA) references of the DASD by a disk formatter, the system comprising:
  (a) a VT table that contains entries representing virtual track addresses of the DASD;
  (b) a VS table that contains entries representing defect sectors of the DASD;
  (c) a sector prototype spares table that contains entries representing the number of spare sectors contained in all DASD sectors at an initial time;
  (d) a sector reassignment table that contains entries representing sectors that have been reassigned from spare sectors to data sectors;
    wherein the disk formatter translates the FLBA references to PBA references by receiving an FLBA and selecting a virtual track number from the FLBA and a virtual sector number from the FLBA, referencing the virtual track number and the next virtual track number into a VT table to select a starting VS table sector index value for a search of a VS table and to select an ending boundary value for the search, and referencing a selected VS table sector index value into the VS table to select a defect skip offset, referencing the virtual track number and the next virtual track number into a VS Reassignment table to select a starting VS Reassignment table sector index value for a search of the VS Reassignment table and to select an ending boundary value for the search, and referencing a selected VS Reassignment table sector index value to select a sector reassignment offset, referencing the virtual track number and the next virtual track number into a VS Prototype Spares table to select a starting VS prototype spares table sector index value for a search of the VS Prototype Spares table and to select an ending boundary value for the search, and referencing a selected VS Prototype Spares table sector index value to select a prototype spares offset, and determining the PBA by combining the selected VS table sector index value, defect skip offset, sector reassignment offset, and prototype spares offset.

14. A system as defined in claim 13, wherein the formatter searches the VS table by locating a VS table entry that is greater than the selected virtual sector number and whose index into the VS table is greater than or equal to the starting VS table sector index value and not greater than the search ending boundary value.

15. A system as defined in claim 14, wherein the formatter searches the VS Reassignment table by locating a VS Reassignment table entry that is greater than the selected virtual sector number and whose index value into the VS Reassignment table is greater than or equal to the starting VS Reassignment table sector index value and not greater than the search ending boundary value.

16. A system as defined in claim 14, wherein the formatter searches the VS Prototype Spares table by locating a VS Prototype Spares table entry that is greater than the selected virtual sector number and whose index value into the VS Prototype Spares table is greater than or equal to the starting VS Prototype Spares sector index value and not greater than the search ending boundary value.

17. A system as defined in claim 13, wherein the VS table contains entries that represent defective sectors only.

18. A system as defined in claim 13, wherein the VS table contains entries that represent defective sectors and contains no entries that represent spare sectors.

19. A storage device formatter for a direct access data storage device having a data recording medium with spaced tracks and data storage sectors, wherein the formatter receives file logical block address (FLBA) data references for translation into physical block address (PBA) references of the data storage system, and the formatter translates the FLBA references to PBA references by receiving an FLBA and selecting a virtual track number from the FLBA and a virtual sector number from the FLBA, referencing the virtual track number and the next virtual track number into a VT table to select a starting VS table sector index value for a search of a VS table and to select an ending boundary value for the search, and referencing a selected VS table sector index value into the VS table to select a defect skip offset, referencing the virtual track number and the next virtual track number into a VS Reassignment table to select a starting VS Reassignment table sector index value for a search of the VS Reassignment table and to select an ending boundary value for the search, and referencing a selected VS Reassignment table sector index value to select a sector reassignment offset, referencing the virtual track number and the next virtual track number into a VS Prototype Spares table to select a starting VS prototype spares table sector index value for a search of the VS Prototype Spares table and to select an ending boundary value for the search, and referencing a selected VS Prototype Spares table sector index value to select a prototype spares offset, and determining the PBA by combining the selected VS table sector index value, defect skip offset, sector reassignment offset, and prototype spares offset.

20. A storage device formatter as defined in claim 19, wherein the formatter searches the VS table by locating a VS table entry that is greater than the selected virtual sector number and whose index into the VS table is greater than or equal to the starting VS table sector index value and not greater than the search ending boundary value.

21. A storage device formatter as defined in claim 20, wherein the formatter searches the VS Reassignment table by locating a VS Reassignment table entry that is greater than the selected virtual sector number and whose index value into the VS Reassignment table is greater than or equal to the starting VS Reassignment table sector index value and not greater than the search ending boundary value.

22. A storage device formatter as defined in claim 20, wherein the formatter searches the VS Prototype Spares table by locating a VS Prototype Spares table entry that is greater than the selected virtual sector number and whose index value into the VS Prototype Spares table is greater than or equal to the starting VS Prototype Spares sector index value and not greater than the search ending boundary value.

23. A storage device formatter as defined in claim 19, wherein the VS table contains entries that represent defective sectors only.

24. A storage device formatter as defined in claim 19, wherein the VS table contains entries that represent defective sectors and contains no entries that represent spare sectors.

25. A program product for use in a computer system that executes program steps recorded in a computer-readable media to perform a method for translating file logical block address (FLBA) data references of a direct access storage device (DASD) into physical block address (PBA) references of the DASD, the program product comprising:
  a recordable media; and
  a program of computer-readable instructions executable by the computer system to perform method steps comprising:
   (a) receiving an FLBA and selecting a virtual track number from the FLBA and a virtual sector number from the FLBA;
   (b) referencing the virtual track number and the next virtual track number into a VT table to select a starting VS table sector index value for a search of a VS table and to select an ending boundary value for the search, and referencing a selected VS table sector index value into the VS table to select a defect skip offset;
   (c) referencing the virtual track number and the next virtual track number into a VS Reassignment table to select a starting VS Reassignment table sector index value for a search of the VS Reassignment table and to select an ending boundary value for the search, and referencing a selected VS Reassignment table sector index value to select a sector reassignment offset;
   (d) referencing the virtual track number and the next virtual track number into a VS Prototype Spares table to select a starting VS prototype spares table sector index value for a search of the VS Prototype Spares table and to select an ending boundary value for the search, and referencing a selected VS Prototype Spares table sector index value to select a prototype spares offset; and
   (e) determining the PBA by combining the selected VS table sector index value, defect skip offset, sector reassignment offset, and prototype spares offset.

26. A program product as defined in claim 25, wherein the method step of searching the VS table comprises locating a VS table entry that is greater than the selected virtual sector number and whose index into the VS table is greater than or equal to the starting VS table sector index value and not greater than the search ending boundary value.

27. A program product as defined in claim 26, wherein the step of searching the VS Reassignment table comprises locating a VS Reassignment table entry that is greater than the selected virtual sector number and whose index value into the VS Reassignment table is greater than or equal to the starting VS Reassignment table sector index value and not greater than the search ending boundary value.

28. A program product as defined in claim 26, wherein the step of searching the VS Prototype Spares table comprises locating a VS Prototype Spares table entry that is greater than the selected virtual sector number and whose index value into the VS Prototype Spares table is greater than or equal to the starting VS Prototype Spares sector index value and not greater than the search ending boundary value.

29. A program product as defined in claim 25, wherein the VS table contains entries that represent defective sectors only.

30. A program product as defined in claim 25, wherein the VS table contains entries that represent defective sectors and contains no entries that represent spare sectors.

31. A program product as defined in claim 25, wherein the computer system comprises a host computer that receives the recordable media and transfers the recorded program steps to program memory of a storage media formatter for execution.

32. A method of operating a storage device formatter for a direct access data storage device (DASD) such that the DASD translates a file logical block address (FLBA) data reference into a physical block address (PBA) reference, the method of operating the storage device formatter comprising the steps of:
  establishing network communication;
  receiving data over the network, the data comprising program instructions executable by the computer system to perform method steps comprising:
   (a) receiving an FLBA and selecting a virtual track number from the FLBA and a virtual sector number from the FLBA;
   (b) referencing the virtual track number and the next virtual track number into a VT table to select a starting VS table sector index value for a search of a VS table and to select an ending boundary value for the search, and referencing a selected VS table sector index value into the VS table to select a defect skip offset;
   (c) referencing the virtual track number and the next virtual track number into a VS Reassignment table to select a starting VS Reassignment table sector index value for a search of the VS Reassignment table and to select an ending boundary value for the search, and referencing a selected VS Reassignment table sector index value to select a sector reassignment offset;

(d) referencing the virtual track number and the next virtual track number into a VS Prototype Spares table to select a starting VS prototype spares table sector index value for a search of the VS Prototype Spares table and to select an ending boundary value for the search, and referencing a selected VS Prototype Spares table sector index value to select a prototype spares offset; and (e) determining the PBA by combining the selected VS table sector index value, defect skip offset, sector reassignment offset, and prototype spares offset.

33. A method as defined in claim 32, wherein the method step of searching the VS table comprises locating a VS table entry that is greater than the selected virtual sector number and whose index into the VS table is greater than or equal to the starting VS table sector index value and not greater than the search ending boundary value.

34. A method as defined in claim 33, wherein the step of searching the VS Reassignment table comprises locating a VS Reassignment table entry that is greater than the selected virtual sector number and whose index value into the VS Reassignment table is greater than or equal to the starting VS Reassignment table sector index value and not greater than the search ending boundary value.

35. A method as defined in claim 33, wherein the step of searching the VS Prototype Spares table comprises locating a VS Prototype Spares table entry that is greater than the selected virtual sector number and whose index value into the VS Prototype Spares table is greater than or equal to the starting VS Prototype Spares sector index value and not greater than the search ending boundary value.

36. A method as defined in claim 32, wherein the VS table contains entries that represent defective sectors only.

37. A method as defined in claim 32, wherein the VS table contains entries that represent defective sectors and contains no entries that represent spare sectors.

38. A method as defined in claim 32, wherein the step of establishing network communication is performed with a host computer, and the step of receiving the program instructions comprises receiving the program instructions at the host computer and transferring them into program memory of a storage media formatter for execution.

* * * * *